(12) United States Patent
Kelkar et al.

(10) Patent No.: US 6,335,415 B1
(45) Date of Patent: Jan. 1, 2002

(54) PROCESS FOR THE PREPARATION OF A POLYESTER

(75) Inventors: Ashutosh Anant Kelkar; Shrikant Madhukar Kulkarni; Raghunath Vitthal Chaudhari, all of Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 09/774,304

(22) Filed: Jan. 30, 2001

(51) Int. Cl.[7] ............................. C08G 18/40; C08K 5/49
(52) U.S. Cl. ......................... 528/86; 528/219; 528/397; 528/425; 524/81; 524/167; 524/424; 524/425; 524/436; 524/442; 524/709; 524/755; 524/765; 524/779; 524/781; 524/785
(58) Field of Search ...................... 528/86, 219, 397, 528/425; 524/81, 424, 167, 425, 436, 442, 709, 755, 765, 779, 781, 785

(56) References Cited

U.S. PATENT DOCUMENTS 4,990,657 A    2/1991    Bluthe et al. ................ 562/406

FOREIGN PATENT DOCUMENTS

| EP | 0 206 543 A2 | 12/1986 | ........... C07B/37/04 |
| EP | 0 255 794 A1 | 2/1988  | ........... C07C/51/10 |
| EP | 0 355 840 A2 | 2/1990  | ........... C08G/63/00 |

*Primary Examiner*—Samuel A. Acquah
(74) *Attorney, Agent, or Firm*—Darby & Darby

(57) ABSTRACT

Polyesters may be prepared by reacting an amyl diiodide, an aliphatic or aryl diol and carbon monoxide in presence of a catalyst and an organic base. The process is preferentially carried out in a solvent. The catalyst is a heterogeneous catalyst containing a metal selected from a group containing Palladium, Platinum, Nickel and Cobalt. Following the formation of polyester, the catalyst can be easily separated and efficiently recycled.

18 Claims, No Drawings

PROCESS FOR THE PREPARATION OF A POLYESTER

FIELD OF THE INVENTION

The present invention relates to a process for the preparation of a polyester. More particularly, the present invention relates to a process for the preparation of a polyester from aromatic dilodide, an alkyl or aryl diol and carbon monoxide. More specifically, the invention is concerned with a process for preparing polyesters by contacting an aryl diiodide and an alkyl or aromatic diol with carbon monoxide in presence of a catalyst, the said catalyst then being recovered and recycled further.

BACKGROUND OF THE INVENTION

Polyesters constitute an important class of polymers with extensive commercial applications. The interests in polyesters as industrial material originates form their excellent heat resistance, high strength and high modulus. Generally, polyesters are prepared by;

1. Direct polyesterification (e.g Dicarboxylic acid+diol)
2. Ester exchange (Dialkyl or diaryl ester+diol)
3. Polycondensation of acid chloride and a diol
4. Lactone ring opening polymerization.

While, there are many other different methods for the polyester preparation, most of such conventional processes are characterized by difficulties in handling of unstable aromatic diacids or dichlorides, expensive starting materials and high reaction temperatures during their preparation.

The prior art has shown, as exemplified by U.S. Pat. Nos. 4,933,419 and 4,948,864 that polyesters may be produced from aromatic diiodides or dibromides and diols by treatment with a carbon monoxide using a palladium catalyst. This method of palladium-catalyzed carbonylation—polycondensation of aromatic dihalides and diol for the polyester manufacture based on Heck reaction, was originally developed by Emai and co-workers and subsequently by Perry and co-workers. The commonly employed solvent is monochlorobenzene. The resultant polyester is soluble in the reaction diluent and may be recovered by precipitating into methanol. Thus, all the reaction components including reacting monomers, catalyst and resultant polymer are soluble in the reaction medium. Until now, only homogeneous catalyst compositions have employed in such process A particular disadvantage, which neglects the commercial use of such homogeneous catalysts, is the difficulties in the efficient separation, recovery and further recycling of the catalyst. The loss of the precious metal during frequent recovery cycles makes any such process uneconomical to operate and overshadows technologically attractive conversion rates obtained with homogeneous catalysts.

Because of the commercial interest in polyesters, increasing academic as well as industrial attention has been paid towards research in developing new methods for their preparation. In view of the advantages and features of the present invention, the process of this invention would be a significant advance in the current state of the art related to the polyester synthesis.

Polyesters constitute an important class of synthetic polymers and have enjoyed great amount of commercial as well as industrial interest because of their high performance properties like superior mechanical strength and heat resistance. Conventional methods of preparation for the polyesters are characterised by high temperatures and handling of unstable and expensive reactants like diacid chlorides and the like. Documented literature reveals that only homogeneous catalysts have been investigated so far. A particular disadvantage of the commercial use of such homogeneous catalysts, is the difficulty in the efficient separation, recovery and further recycling of the catalyst. The loss of the precious metal during frequent recovery cycles makes any such process uneconomical to operate and overshadows technologically attractive conversion rates obtained with homogeneous catalysts.

OBJECTS OF THE INVENTION

It is an object of this invention to provide a process for polyester preparation with the provision for catalyst recovery.

It is a further object of this invention to provide a one step process for the preparation of polyesters utilizing a precious metal catalyst such as a palladium catalyst, which is easily recoverable and reusable in the process.

SUMMARY OF THE INVENTION

Accordingly the present invention provides a process for the preparation of polyester of the general formula (III) [—CO—$Ar^1$—CO—O—$Ar^2$—O—]$_n$ wherein $Ar^1$ is a bivalent aromatic residue and $Ar^2$ is an aromatic or alkyl residue, said process comprising reacting an aromatic diiodide of the general formula (I) I—Ar—I wherein $Ar^1$ is a divalent aromatic residue, with a diol of the general formula (II) HO—R—OH wherein $Ar^2$ is a bivalent aromatic or alkyl radical and carbon monoxide in presence of a catalyst containing a group VIII metal and a heterogeneous carrier or support, a base and a solvent.

In one embodiment of the invention, the aromatic diiodide is selected from the group consisting of m-diiodobenzene, p-diiodobenzene, 4,4'diiodobiphenyl, bis(4-iodophenyl) ether and 2,7-diioddnaphatahlene.

In one embodiment of the invention, wherein the diol is selected from the group consisting of Bisphenol A; 4,4' dihydroxy biphenyl; 4,4' biphenol, 4,4' dihydroxy diphenyl sufone, 4,4' dihydroxydiphenyl sulfone; 1,4 butane diol, 1,6 hexane diol and 1,3 propane diol.

In a further embodiment of the invention, the group VII metal in the catalyst is selected from the group consisting of Rhodium, Palladium, Platinum, Nickel and Cobalt.

In one embodiment of the invention, wherein the catalyst is a heterogeneous palladium catalyst.

In a further embodiment of the invention, wherein the heterogeneous palladium catalyst is selected from the group consisting of Pd/C; Pd/$Al_2O_3$; Pd/$CaCO_3$, Pd/ZSM-5 and Pd/$MgCl_2$.

In another embodiment of the invention, the carrier is an inorganic material selected from the group consisting of carbon powder, alumina, silica, carbonates and chlorides of calcium, magnesium and zeolite or an organic carrier selected from the group consisting of polymers such as polystyrene, polyvinyl pyrrolidene, polyaniline and polyethylene glycol.

In another embodiment of the invention, the catalyst preferably includes a phosphine selected from the group consisting of triphenylpbosphine, tri-toluylphosphine and trialkylphosphoine or a diphosphine selected from the group consisting of 1,3-diphenylphosphinepropane, 1,4-diphenylphosphinobutane and 1,3-diethylphosphinopropane.

In another embodiment of the invention, the solvent is selected from the group consisting of dimethylacetamide, dimethylformamide, N-methylpyrolidine, pyrridene, benzene, toluene, monochlorobenzene, xylene and tetrahydrofuran.

In another embodiment of the invention, the base employed is selected from the group consisting of a tertiary amine of the general formula $NR_3$ wherein each R is independently selected from a group containing alkyl, aryl, cycloalkyl residues which may be substituted or unsubstituted, metal hydroxide and metal carbonates.

In a further embodiment of the invention, the base is selected from the group consisting of DBU, DBN, DABCO, triethylamine, tri-butyl amine, $Na_2CO_3$, KOH, NaOH and sodium acetate.

In a further embodiment of the invention, the base is used in its free state or immobilized on a carrier.

In a further embodiment of the invention, the reaction is conducted at a pressure from 0.1 to 100 bars.

In a further embodiment of the invention, the CO used is pure.

In a further embodiment of the invention, the CO is diluted with other gases selected from the group consisting of argon, nitrogen and helium.

In a further embodiment of the invention, the reaction is conducted at a temperature ranging from 60° C. to 210° C.

In another embodiment of the invention, the heterogeneous catalyst is recycled.

DETAILED DESCRIPTION OF THE INVENTION

The present invention provides a method for the preparation of polyesters by contacting an aromatic diiodide, an alkyl or aryl diol and carbon monoxide in presence of a catalyst, an organic base and preferably, a liquid reaction diluent. The said catalyst is a heterogeneous catalyst composition containing a group VII metal, preferably, palladium. The present invention is described below in greater detail.

The catalyst used is a heterogeneous catalyst containing group VIII metal and a heterogeneous carrier or support. In the present specification and claims the term "Group VIII metal" encompasses the metals: Rhodium, Palladium, Platinum, Nickel and Cobalt. The catalyst composition containing palladium is more favored. In accordance with this invention, wide range of compounds can serve as a carrier or support for the transition metal in a catalyst system. The support is preferably inert under the reaction conditions for the better catalyst performance. The carrier may be an inorganic material or an organic compound. Typical carrier examples include carbon powder, alumina, silica; carbonates and chlorides of calcium, magnesium; zeolite etc. The suitable examples for organic carriers include polymers e.g. polystyrene, polyvinyl pyrrolidene, polyaniline, polyethylene glycol. Typical examples of such catalysts include Pd on carbon, Pd/silica, Pd/γ-$Al_2O_3$, Pd/$CaCO_3$, Pd-ZSM5. The catalyst of the present invention can be easily prepared by documented procedures without any special effort and modification, without affecting the catalyst performance. The ratio of metal to carrier is not a true variable and can be adjusted according to the process constraints. In a typical composition the metal/support ratio can be 0.001 to 1000. Catalyst compositions with metal/carrier ratio below or above these may also be employed if desired.

The amount of catalyst that can be used in the process may vary within wide limits. Generally, the amount of catalyst is at least about $10^{-5}$ mol percent based on the amount of diiodide used. Typically the amount of catalyst is 0.00001 to 100 mol percent of the diiodide used. There is no real upper limit for the amount of catalyst used in the said process and it is defined mainly by the ease and cost effectiveness of the process.

It is advantageous to add phosphine compounds in the catalyst. Typical examples of phosphine that can be employed include triphenylphosphine, tri-toluylphosphine, trialkylphosphoine. Alternatively diphosphine compounds can also be employed. Typical examples of diphosphine include 1,3-diphenylphosphinepropane, 1,4-diphenylphosphinobutane, 1,3-diethylphosphinopropane. Alternatively the active catalyst system can be prepared by supporting a preformed transition metal - phosphine ligand on a carrier. The amount of phosphine that can be used may vary widely, Typically the ratio of 6 to 0.01 of ligand. metal being preferred.

In another embodiment, the process of this invention may be carried out using monofunctional or polyfunctional compounds. The monofunctional compounds serve as end-capping agents. In general terms, bifunctional materials give linear polyesters while use of monomers with functionality more than two give branched polyesters. The reacting materials, preferably, should not contain other functionality capable of reacting under the reaction conditions to avoid the formation of unwanted byproducts.

In another embodiment, the process of this invention is not limited to any particular aromatic iodo compound and wide variety of iodoaromatics which can react under the employed reaction conditions to give polyesters can serve as monomers The iodoaromatic compounds are represented by general formula (I), wherein Ar is an aromatic residue selected from a group containing hydrocarbons like benzene, naphthalene, biphenyl; aromatic compounds containing heteroatoms like Nitrogen, Oxygen, Sulfur e.g. pyridene, isoquinoline, dibenzofuran, thiophene etc. The iodo substituents need not be attached to the same aromatic nucleus and can be separated by a bridging group. The preferred iodoaromatics include m-diiodobenzene, p-diiodobenzene, 4,4'-diiodobiphenyl, 3,3'-diiodobiphenyl; 1,4-diiodonaphathalene, 2,6-diiodonaphathalene; bis (4-iodophenyl) ether; 2,5-diiodothiophene.

The polyol used in the present invention may be represented by a general formula (II), where R can be alkyl or aryl. The examples of aryl R' include aromatic diols wherein Ar can represent the aromatic system in (I). Typical examples for aromatic diols include 4,4'-biphenol; 1,4-dihydrozy benzene; 2,7-dihydroxy naphthalene; 4,4'-dihydroxybipheneyl; bis(4-hydroxyphenyl)ether; bis(4-hydroxyphenyl) sulfone etc. The examples of alkyl R are represented by a general formula (III). The suitable examples of aliphatic diol include linear diols OH—$(CH_2)$n—OH where n=1–10. Alternatively the aliphatic diol need not to be essentially linear, and branched or substituted diols like 2,2dimethyl-1,3 propanediol etc may also be used.

The process of the invention is preferably carried out in presence of liquid reaction medium. Wide range of solvents can be used as liquid reaction medium. The suitable examples include monochlorobenzene, N,N-dimetylacetamide (DMAc); N,N dimethylformamide (DMF); dimethylsolfoxide (DMSO); N-methyl pyrroolidone (NMP); hexamethylphosphoramide, Examples of other solvents that can be employed as solvents are tetrahydrofuran (THF); 1,4-dioxane, Diglyme, alkanes. There is no restriction on the amount of solvent to be used and preferably it is such as to ensure the maximum intimate mixing of the reactants.

The process of the present invention is preferably carried out in presence of a base acting as a neutralizer for hydrogen iodide generated during the course of the reaction as a by-product. Preferably the base employed, according to this invention, is a tertiary amine having general formula $NR_3$ wherein each R is independently selected from a group containing alkyl, aryl, cycloalkyl residues which may be substituted or unsubstituted. Suitable examples for such bases include DBU, DBN, DABCO, triethylamine, tri-butyl amine. Alternatively other bases like Metal hydroxide or metal carbonates e.g. $Na_2CO_3$, KOH, NaOH, sodium acetate can also be employed. The base may be used in its free state or can be immobilized on a carrier. The amount of any such base employed should at least be sufficient to neutralize the hydrogen halide although excess may be employed if desired.

The preferred CO pressure in such process is in the range 0.1 to 100 bars, particularly in the range of 1 to 30 bars. CO used can be highly pure or may be diluted with other gases like argon, nitrogen or helium wherein the amount of diluent can vary widely.

The process is preferably carried out at a temperature ranging from 20° C. to 300° C. Temperatures in the range of 70° C.–160° C. are preferred. It is also disclosed further that the pressures and temperatures outside the given range can also be employed, if desired.

The present invention provides a catalytic method for the preparation of polyesters with provision for a catalyst separation, recovery and reuse. The catalyst being insoluble in the reaction diluent, can be easily separated since all other components including starting monomers, polyester product are soluble. The catalyst may be washed with suitable solvent like one used as reaction solvent, to ensure better removal of adhering product on it's surface. The catalyst may be used as recovered for the subsequent reaction or can be activated by typical activation methods like calcination etc. The polyester may be recovered by precipitation in methanol.

Although the reactions described here to illustrate the catalyst activity and the process involve reference to individual monomer compounds, the scope of the present invention is not limited to any individual compound and covers variety of similar type of substrates, that react in presence of said catalyst and conditions, to give polyesters. It is an advantageous feature of the said catalyst system and the process that it allows wide range of variation as demanded by batch size, substrate reactivity, ease of in process and after process operations like stirring catalyst and product separation etc.

The catalytic method of the present invention for the preparation of polyesters do not require high temperatures and the starting materials are, in particular stable and easy to handle. The method of the invention is based on heterogeneous metal catalysts, which can be easily separated and efficiently recycled during the subsequent process, which is difficult with a competitive process employing homogeneous palladium catalysts.

The present invention is described in more details with reference to following examples that are only illustrative and should not be construed as a limitation on the scope of the invention.

EXAMPLE 1

The polymerization reactor was charged with,
4,4' Diiodobiphenyl (1.015 gm, 2.5 mmol),
Bisphenol - A (0.570 gm, 2.5 mmol),
DBU (0.760 gm 5 mmol)
Triphenylphosphine (104 mg, 0.4 mmol),
5% $Pd/CaCO_3$ (214 mg, Pd content is 10.7 mg, 0.1 mmol)
Monochlorobenzene (20 ml)

The polymerization reaction was performed in a 50-ml capacity SS autoclave supplied by Autoclave Engineers fitted with stirrer, pressure transducer, and valves for pressure inlet and release. The reaction mixture was then stirred and flushed twice with nitrogen and then with carbon monoxide and then heated to 140° C. When the desired temperature of 140° C. was attained, the vessel was pressurized to 300 psig of carbon monoxide, The reaction was allowed to proceed for three hours. At the end of the reaction time the vessel was cooled to room temperature and excess gas was vent off. The contents of the vessel were then transferred to a glass jar and filtered. The heterogeneous catalyst was collected on the filter paper, washed with 2×5 ml of monochlorobenzene to ensure removal any adhering reactant or product. The filtrate along with washing was poured into 100 ml of methanol with vigorous stirring to precipitate the polyester as a white solid. This was then filtered under vacuum and the solid were washed with additional 2×20 ml of methanol and dried in vacuum. Yield was 550 mg. IR of the polymer showed peaks at 1734 $cm^{-1}$, characteristic carbonyl group, C=O of the ester function. The reduced viscosity was determined to be 0.2 dL/g by analyzing the solution of polymer in o-chlorophenol at a concentration of 3 gm/liter at 30° C.

The catalyst filtered above was recycled, as it is without any treatment in the next run with same quantities as taken earlier of all other reaction components. The polymerization was conducted essentially in the same fashion as earlier to obtain 310 mg of polyester. The IR showed peak at 1734 $cm^{-1}$ which was characteristic to an ester carbonyl. The reduced viscosity was found to be 0.18 dL/g by analyzing the solution of polymer in o-chlorophenol at a concentration of 3 gm/liter at 30° C.

EXAMPLE 2

The procedure in example 1 was exactly repeated except for a change that 5% Pd on γ-$Al_2O_3$ (214 mg, Pd content is 10.7 mg, 0.1 mmol ; pellet form) was used as a catalyst in place of 5% $pd/CaCO_3$. The polymerization reaction was performed in the same fashion as detailed in examples 1. Yield was 350 mg. IR of the polymer showed peaks at 1734 $cm^{-1}$, characteristic carbonyl group, C=O of the ester function. The reduced viscosity was determined to be 0.12 dL/g in o-chlorophenol at a concentration of 3 gm/liter at 30° C.

The catalyst from this reaction was recycled; as described in the example 1 to obtain 80 mg of polyester. The IR showed peak at 1734 $cm^{-1}$ which was characteristic to an ester carbonyl. The reduced viscosity was found to be 0.11 dL/g by analyzing the solution of polymer in o-chlorophenol at a concentration of 3 gm/liter at 30° C.

EXAMPLE 3

The procedure in example 1 was exactly repeated except for a change that the catalyst used was based on zeolite composition wherein an active catalyst Pd $(PPh_3)_2$ was encapsulated in a zeolite structure. The amount of net Pd content was determined to 10.7% by XRD. Following a calcination period of 14 hours the catalyst was used in the polymerization reaction. Amount of catalyst taken was 100 mg, Pd content is 10.7 mg, 0.1 mmol.

The polymerization reaction was performed in the same fashion as described in example 1 to yield 210 mg of polyester. IR of the polymer showed peaks at 1734 cm$^{-1}$, characteristic carbonyl group, C=O of the ester function. The reduced viscosity was determined to be 0.5 dL/g by analyzing the solution of polymer in o-chlorophenol at a concentration of 3 gm/liter at 30° C.

The catalyst from above was recycled essentially in the same fashion as detailed in example 1 to obtain 240 mg of polyester. The TR showed peak at 1734 cm$^{-1}$ which was characteristic to an ester carbonyl. The reduced viscosity was found to be 0.45 dL/g by analyzing the solution of polymer in o-chlorophenol at a concentration of 3 gm/liter at 30° C.

EXAMPLE 4

The procedure in example 1 was exactly repeated except for a change that the catalyst used was 5% Pd on carbon (214 mg, Pd content is 10.7 mg, 0.1 mmol).

The polymerization reaction was performed as detailed in example 1 to yield 370 mg of polymer. IR of the polymer showed peaks at 1734 cm$^{-1}$, characteristic carbonyl group, C=O of the ester function. The reduced viscosity was determined to be 0.7 dL/g by analyzing the solution of polymer in o-chlorophenol at a concentration of 3 gm/liter at 30° C.

The catalyst recycle was performed as detailed in example 1, to obtain 80 mg of polyester The IR showed peak at 1734 cm$^-$which was characteristic to an ester carbonyl. The reduced viscosity was found to be 07 dL/g by analyzing the solution of polymer in o-chlorophenol at a concentration of 3 gm/liter at 30° C.

Advantageous Features of the Present Invention

1. Present invention for the first time demonstrates the use of heterogeneous catalyst for the preparation of polyesters using catalytic carbonylation of diiodides and diols.
2. In contrast with the competitive homogeneous catalyst such heterogeneous catalysts as proposed in the present invention can be easily separated, recovered and efficiently recycled subsequently.

We claim:

1. A process for the preparation of polyester represented by the general formula (III) [—CO Ar$^1$—CO—O—Ar$^2$—O—]$_n$, wherein Ar$^1$ represents a bivalent aromatic residue and Ar2 represents an aromatic or alkyl residue, said process comprising reacting an aromatic diiodide represented by a general formula (I) I—Ar—I wherein Ar is a divalent aromatic residue, with a diol represented by a general formula (II) HO—R—OH wherein R is a bivalent aromatic or alkyl radical, and carbon monoxide in presence of a catalyst consisting of a Group VIII metal and a heterogeneous carrier or support, a base and a solvent.

2. A process as claimed in claim 1, wherein the aromatic diiodide is selected from the group consisting of m-diiodobenzene, p-diiodobenzene, 4,4'diiodobiphenyl, bis (4-iodophenyl)ether and 2,7- diioddnaphthalene.

3. A process as claimed in claim 1, wherein the diol is selected from the group consisting of Bisphenol A; 4,4'dihydroxy biphenyl; 4,4'biphenol; 4,4'dihydroxy diphenyl sufone; 4,4'dihydroxydiphenyl sulfone; 1,4 butane diol; 1,6 hexane diol and 1,3 propane diol.

4. A process as claimed in claim 1 wherein the group VIII metal in the catalyst is selected from the group consisting of Rhodium, Palladium, Platinum, Nickel and Cobalt.

5. A process as claimed in claim 4 wherein the catalyst is a heterogeneous palladium catalyst.

6. A process as claimed in claim 5 wherein the heterogeneous palladium catalyst is selected from the group consisting of Pd/C; Pd/Al$_2$O$_3$; Pd/CaCO$_3$, Pd/ZSM-5 and Pd/MgCl$_2$.

7. A process as claimed in claim 1 wherein the carrier is an inorganic material selected from the group consisting of carbon powder, alumina, silica, carbonates and chlorides of calcium, magnesium and zeolite.

8. A process as claimed in claim 1 wherein the carrier is an organic carrier selected from the group consisting of polymers such as polystyrene, polyvinyl pyrrolidene, polyaniline and polyethylene glycol.

9. A process as claimed in claim 1 wherein the catalyst comprises a phosphine selected from the group consisting of triphenylphosphine, tri-toluylphosphine and trialkylphosphoine or a diphosphine selected from the group consisting of 1,3-diphenylphosphinepropane, 1,4-diphenylphosphinobutane and 1,3-diethylphosphinopropane.

10. A process as claimed in claim 1 wherein the solvent is selected from the group consisting of dimethylacetamide, dimethylformamide, N-methylpyrrolidine, pyrridene, benzene, toluene, monochlorobenzene, xylene and tetrahydrofuran.

11. A process as claimed in claim 1 wherein the base employed is selected from the group consisting of a tertiary amine of the general formula NR$_3$ wherein each R is independently selected from a group consisting of alkyl, aryl, cycloalkyl residues which may be substituted or unsubstituted, metal hydroxide and metal carbonates.

12. A process as claimed in claim 11 wherein the base is selected from the group consisting of DBU, DBN, DABCO, triethylamine, tri-butyl amine, Na$_2$CO$_3$, KOH, NaOH and sodium acetate.

13. A process as claimed in claim 1 wherein the base is used in its free state or immobilized on a carrier.

14. A process as claimed in claim 1 wherein the reaction is conducted at a pressure from 0.1 to 100 bars.

15. A process as claimed in claim 1 wherein the CO used is pure.

16. A process as claimed in claim 1 wherein the CO is diluted with a gas selected from the group consisting of argon, nitrogen and helium.

17. A process as claimed in claim 1 wherein the reaction is conducted at a temperature ranging from 60° C. to 210° C.

18. A process as claimed in claim 1 wherein the heterogeneous catalyst is recycled.

* * * * *